United States Patent
Miura et al.

(10) Patent No.: US 11,285,945 B2
(45) Date of Patent: Mar. 29, 2022

(54) TRAVELING CONTROL SYSTEM AND CONTROL METHOD OF VEHICLE

(71) Applicant: HONDA MOTOR CO., LTD., Tokyo (JP)

(72) Inventors: Hiroshi Miura, Wako (JP); Daisuke Sakai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 210 days.

(21) Appl. No.: 16/689,456

(22) Filed: Nov. 20, 2019

(65) Prior Publication Data

US 2020/0086866 A1 Mar. 19, 2020

Related U.S. Application Data

(63) Continuation of application No. PCT/JP2017/023545, filed on Jun. 27, 2017.

(51) Int. Cl.
*B60W 30/095* (2012.01)
*B60W 30/09* (2012.01)
(Continued)

(52) U.S. Cl.
CPC ........ *B60W 30/0956* (2013.01); *B60W 30/09* (2013.01); *B60W 40/04* (2013.01);
(Continued)

(58) Field of Classification Search
CPC .. B60W 30/0956; B60W 30/09; B60W 40/04; B60W 2554/80; B60W 2555/20;
(Continued)

(56) References Cited

U.S. PATENT DOCUMENTS

| 9,946,937 B2 | 4/2018 | Faber et al. |
| 10,421,491 B2 | 9/2019 | Shimizu |
| 2003/0072471 A1* | 4/2003 | Otsuka ................. G06K 9/4604 382/103 |
| 2006/0047410 A1 | 3/2006 | Oka |

(Continued)

FOREIGN PATENT DOCUMENTS

| JP | 2006-069344 A | 3/2006 |
| JP | 2006-321299 A | 11/2006 |

(Continued)

OTHER PUBLICATIONS

International Search Report for PCT/JP2017/023545 dated Oct. 3, 2017 (partially translated).

*Primary Examiner* — Hunter B Lonsberry
*Assistant Examiner* — Jimin You
(74) *Attorney, Agent, or Firm* — Thomas Horstemeyer, LLP

(57) ABSTRACT

A traveling control system comprises: a detection unit that detects another vehicle traveling in the periphery and peripheral environmental information; an acquisition unit that acquires, based on detected information, a range of a lane on which a self-vehicle travels; a first determination unit that determines, based on the detected information, approach of the other vehicle traveling in the periphery to the acquired lane, on which the self-vehicle travels; and a control unit that performs traveling control to increase a distance between the self-vehicle and the other vehicle if it is determined by the first determination unit that the approach by the other vehicle is made, wherein as the traveling control, the control unit moves a traveling position of the self-vehicle in a lateral direction different from a side of the other vehicle.

4 Claims, 10 Drawing Sheets

(51) Int. Cl.
*B60W 40/04* (2006.01)
*B60W 40/105* (2012.01)
*G05D 1/00* (2006.01)

(52) U.S. Cl.
CPC ......... *B60W 40/105* (2013.01); *G05D 1/0088* (2013.01); *B60W 2554/801* (2020.02); *B60W 2555/20* (2020.02); *G05D 2201/0213* (2013.01)

(58) Field of Classification Search
CPC ......... B60W 2554/801; B60W 40/105; B60W 30/18163; B60W 30/12; B60W 30/08; G08G 1/096775; G08G 1/167; G05D 1/0088; G05D 2201/0213; B62D 6/00
See application file for complete search history.

(56) References Cited

U.S. PATENT DOCUMENTS

| 2014/0233805 | A1 | 8/2014 | Faber et al. |
| 2017/0080940 | A1* | 3/2017 | Ito .................. B60W 10/18 |
| 2017/0369054 | A1* | 12/2017 | Nishimura ........... B60W 30/09 |
| 2018/0025645 | A1* | 1/2018 | Schwindt ............. G08G 1/167 701/301 |
| 2018/0079424 | A1* | 3/2018 | Myers ................. G06N 7/005 |
| 2018/0141588 | A1* | 5/2018 | Shimizu ............ B62D 15/0265 |

FOREIGN PATENT DOCUMENTS

| JP | 2014-518412 A | 7/2014 |
| JP | 2016-151864 A | 8/2016 |
| JP | 2017-061241 A | 3/2017 |
| JP | 2017-061249 A | 3/2017 |
| WO | 2017-22474 A1 | 2/2017 |
| WO | 2019/003295 A1 | 1/2019 |

\* cited by examiner

TRAVELING CONTROL SYSTEM AND CONTROL METHOD OF VEHICLE

CROSS-REFERENCE TO RELATED APPLICATION

This application is a continuation of International Patent Application No. PCT/JP2017/023545 filed on Jun. 27, 2017, the entire disclosures of which is incorporated herein by reference.

TECHNICAL FIELD

The present invention relates to a control technique of a vehicle.

BACKGROUND ART

Conventionally, concerning traveling control of a vehicle, there is disclosed a technique of, in a case in which a congestion rank exists on an adjacent lane next to the traveling lane on which the self-vehicle is traveling, varying traveling position on current traveling lane in a direction reverse to the congestion rank (PTL 1 and the like).

CITATION LIST

Patent Literature

PTL 1: Japanese Patent Laid-Open No. 2006-069344

SUMMARY OF INVENTION

Technical Problem

During traveling on a road constituted by a plurality of lanes, if another vehicle traveling side by side on an adjacent lane performs lane change (cut-in) to the traveling lane of the self-vehicle, the self-vehicle may be affected by the operation.

For example, in traveling on a snowy road, in a case in which a plurality of lanes exist, if a vehicle traveling side by side is going to cut in to the traveling lane of the self-vehicle, snow swirling or the like may affect a sensor mounted on the self-vehicle, and the sensing accuracy may greatly lower. For this reason, along with the lowering of the sensing accuracy of the sensor used for automatic traveling, safety and functionality of automatic traveling lower.

In addition, at the time of cut-in of another vehicle, feeling of safety of an occupant changes depending on the distance or speed difference between the vehicles.

The present invention can maintain and improve safety, functionality, and continuity in automated driving assuming a case in which cut-in by another vehicle occurs during automatic traveling.

Solution to Problem

In order to solve the above-described problem, the present invention has the following arrangement. That is, there is provided a traveling control system comprising:

a detection unit configured to detect another vehicle traveling in the periphery and peripheral environmental information;

an acquisition unit configured to acquire, based on information detected by the detection unit, a range of a lane on which a self-vehicle travels;

a first determination unit configured to determine, based on the information detected by the detection unit, approach of the other vehicle traveling in the periphery to the lane acquired by the acquisition unit, on which the self-vehicle travels; and a control unit configured to perform traveling control to increase a distance between the self-vehicle and the other vehicle if it is determined by the first determination unit that the approach by the other vehicle is made, wherein as the traveling control, the control unit moves a traveling position of the self-vehicle in a lateral direction different from a side of the other vehicle.

Advantageous Effects of Invention

According to the present invention, it is possible to maintain and improve safety, functionality, and continuity in automated driving in a case in which cut-in by another vehicle occurs during automatic traveling.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

An embodiment of the present invention will now be described with reference to the accompanying drawings. Note that the arrangement and the like to be described below are merely examples, and are not limited to those.

First Embodiment

An example of the arrangement of a control system of a vehicle concerning automated driving to which the present invention can be applied will be described first.

Figure 1:
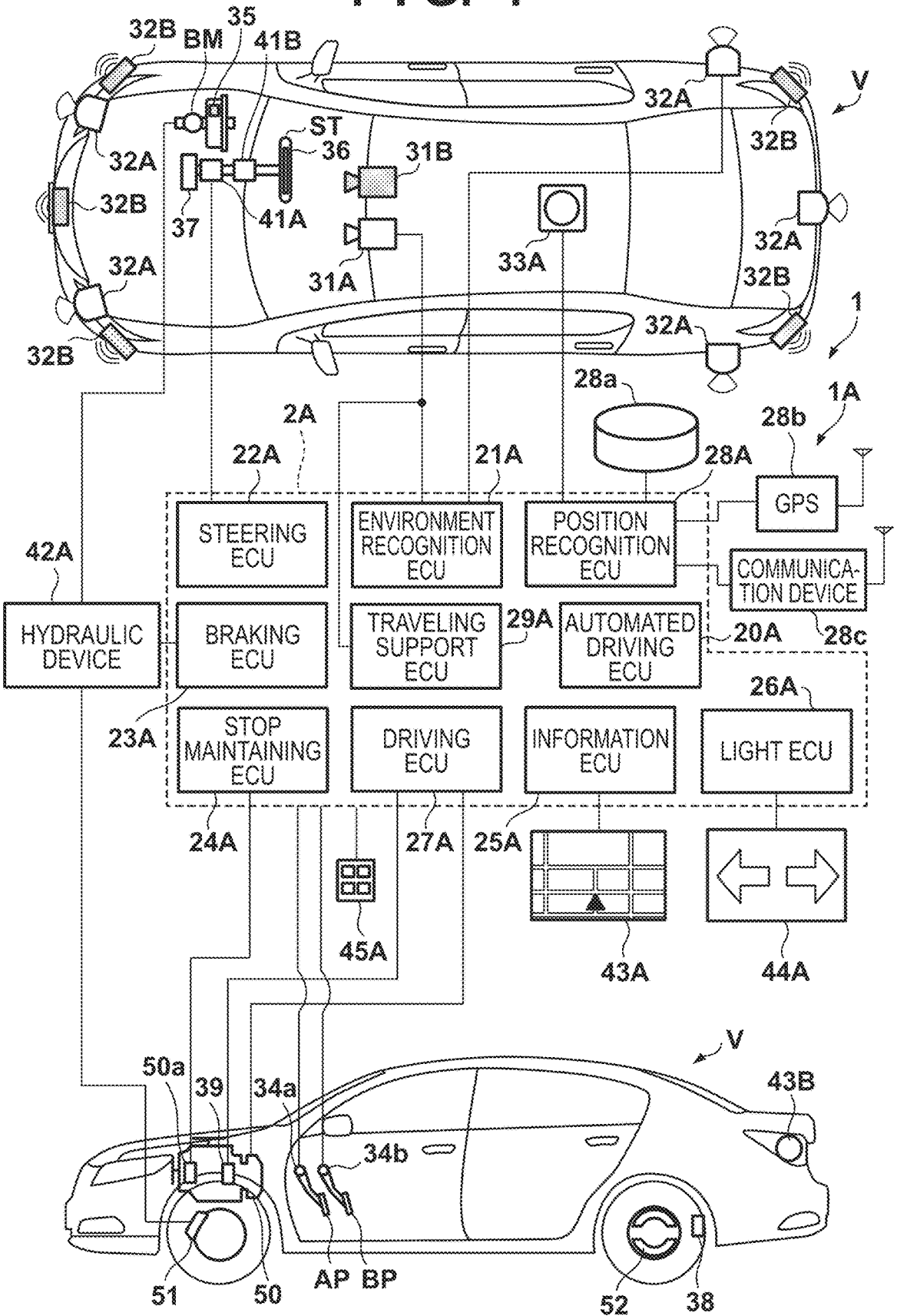
FIG. 1 is a block diagram of a vehicle control system according to an embodiment of the present invention.
Figure 2:
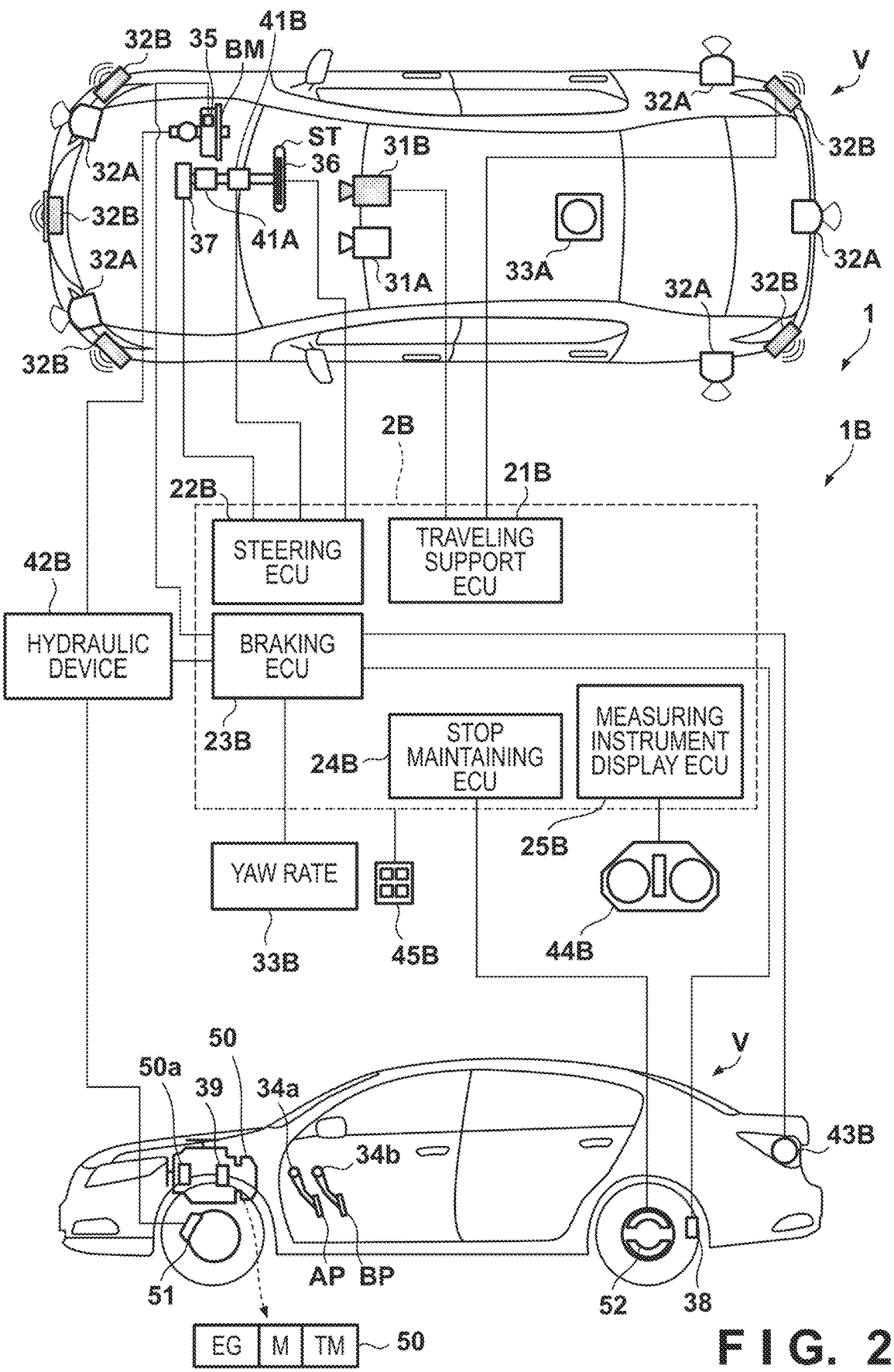
FIG. 2 is a block diagram of the vehicle control system according to an embodiment of the present invention.
Figure 3:
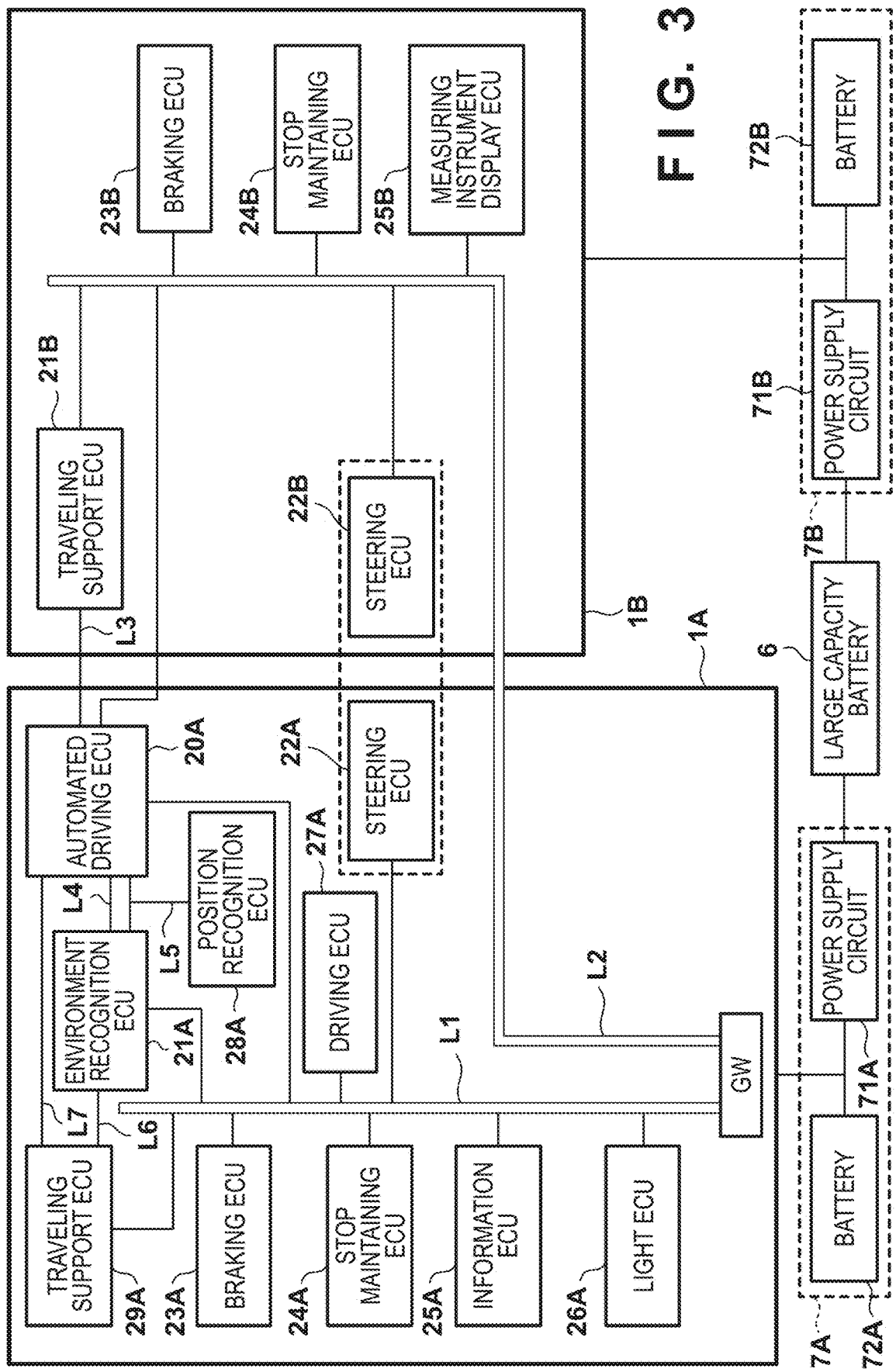
FIG. 3 is a block diagram of the vehicle control system according to an embodiment of the present invention.

FIGS. 1 to 3 are block diagrams of a vehicle control system 1 according to an embodiment of the present invention. The control system 1 controls a vehicle V. In each of FIGS. 1 and 2, an outline of the vehicle V is shown in a plan view and a side view. As an example, the vehicle V is a sedan-type four-wheeled vehicle. The control system 1 includes a control apparatus 1A and a control apparatus 1B. FIG. 1 is a block diagram showing the control apparatus 1A, and FIG. 2 is a block diagram showing the control apparatus 1B. FIG. 3 mainly shows the arrangement of communication lines between the control apparatus 1A and the control apparatus 1B and power supplies.

The control apparatus 1A and the control apparatus 1B make some functions implemented by the vehicle V multiplexed or redundant. This can improve the reliability of the system. The control apparatus 1A performs, for example, not only automated driving control and normal operation control in manual driving but also traveling support control concerning risk avoidance and the like. The control apparatus 1B mainly performs traveling support control concerning risk avoidance and the like. Traveling support will sometimes be referred to as driving support. The control apparatus 1A and the control apparatus 1B are caused to perform different control processes while making the functions redundant, thereby improving the reliability while distributing the control processes.

The vehicle V according to this embodiment is a parallel hybrid vehicle. FIG. 2 schematically shows the arrangement of a power plant 50 that outputs a driving force to rotate the driving wheels of the vehicle V. The power plant 50 includes an internal combustion engine EG, a motor M, and an automatic transmission TM. The motor M is usable as a driving source to accelerate the vehicle V and is also usable as a power generator upon deceleration or the like (regenerative braking).

Control Apparatus 1A

The arrangement of the control apparatus 1A will be described with reference to FIG. 1. The control apparatus 1A includes an ECU group (control unit group) 2A. The ECU group 2A includes a plurality of ECUs 20A to 29A. Each ECU includes a processor represented by a CPU (Central Processing Unit), a storage device such as a semiconductor memory, an interface with an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIGS. 1 and 3, the names of the representative functions of the ECUs 20A to 29A are given. For example, the ECU 20A is denoted by "automated driving ECU".

The ECU 20A executes control associated with automated driving as traveling control of the vehicle V. In automated driving, at least one of driving (acceleration of the vehicle V by the power plant 50, and the like), steering, and braking of the vehicle V is automatically performed independently of the driving operation of the driver. In this embodiment, driving, steering, and braking are automatically performed.

The ECU 21A is an environment recognition unit configured to recognize the traveling environment of the vehicle V based on the detection results of detection units 31A and 32A that detect the peripheral situation of the vehicle V. The ECU 21A generates target data (to be described later) as peripheral environment information.

In this embodiment, the detection unit 31A is an image capturing device (to be sometimes referred to as the camera 31A hereinafter) configured to detect an object around the vehicle V by image capturing. The camera 31A is provided at the roof front of the vehicle V to capture the front side of the vehicle V. When images captured by the camera 31A are analyzed, the contour of a target or a division line (a white line or the like) of a lane on a road can be extracted.

In this embodiment, the detection unit 32A is a lidar (laser radar) (to be sometimes referred to as the lidar 32A hereinafter) configured to detect an object around the vehicle V by light, and detects a target around the vehicle V or measures the distance to a target. In this embodiment, five lidars 32A are provided; one at each corner of the front portion of the vehicle V, one at the center of the rear portion, and one on each side of the rear portion. The number of lidars 32A and their arrangement can appropriately be selected.

The ECU 29A is a traveling support unit configured to execute control associated with traveling support (in other words, driving support) as traveling control of the vehicle V based on the detection result of the detection unit 31A.

The ECU 22A is a steering control unit configured to control an electric power steering device 41A. The electric power steering device 41A includes a mechanism that steers the front wheels in accordance with the driving operation (steering operation) of the driver on a steering wheel ST. The electric power steering device 41A includes a motor that generates a driving force to assist the steering operation or automatically steer the front wheels, a sensor that detects the rotation amount of the motor, a torque sensor that detects the steering torque on the driver, and the like.

The ECU 23A is a braking control unit configured to control a hydraulic device 42A. A braking operation of the driver on a brake pedal BP is converted into a fluid pressure by a brake master cylinder BM and transmitted to the hydraulic device 42A. The hydraulic device 42A is an actuator capable of controlling, based on the fluid pressure transmitted from the brake master cylinder BM, the fluid pressure of hydraulic oil to be supplied to a brake device (for example, a disc brake device) 51 provided in each of the four wheels. The ECU 23A performs driving control of a solenoid valve and the like provided in the hydraulic device 42A. In this embodiment, the ECU 23A and the hydraulic device 42A form an electric servo brake. The ECU 23A controls, for example, the distribution of a braking force by the four brake devices 51 and a braking force by regenerative braking of the motor M.

The ECU 24A is a stop maintaining control unit configured to control an electric parking lock device 50a provided in the automatic transmission TM. The electric parking lock device 50a includes a mechanism that mainly locks the internal mechanism of the automatic transmission TM when the P range (parking range) is selected. The ECU 24A can control lock and unlock by the electric parking lock device 50a.

The ECU 25A is an in-vehicle alarm control unit configured to control an information output device 43A that alarms information in the vehicle. The information output device 43A includes, for example, a display device such as a head-up display and a voice output device. The information output device 43A may further include a vibration device. The ECU 25A causes the information output device 43A to output, for example, various kinds of information such as a vehicle speed and an atmospheric temperature and information such as a path guidance.

The ECU 26A is an external alarm control unit configured to control an information output device 44A that alarms information outside the vehicle. In this embodiment, the information output device 44A is a direction indicator (hazard lamp). The ECU 26A controls blinking of the information output device 44A serving as a direction indicator, thereby alarming the exterior of the vehicle of the advancing direction of the vehicle V. In addition, the ECU 26A controls blinking of the information output device 44A serving as a hazard lamp, thereby increasing the attention of the exterior to the vehicle V.

The ECU 27A is a driving control unit configured to control the power plant 50. In this embodiment, one ECU 27A is assigned to the power plant 50. However, one ECU may be assigned to each of the internal combustion engine EG, the motor M, and the automatic transmission TM. The ECU 27A controls the output of the internal combustion engine EG or the motor M or switches the gear range of the automatic transmission TM in correspondence with, for example, the driving operation of the driver detected by an operation detection sensor 34a provided on an accelerator pedal AP or an operation detection sensor 34b provided on the brake pedal BP, the vehicle speed, or the like. Note that as a sensor that detects the traveling state of the vehicle V, a rotation speed sensor 39 that detects the rotation speed of the output shaft of the automatic transmission TM is provided in the automatic transmission TM. The vehicle speed of the vehicle V can be calculated from the detection result of the rotation speed sensor 39.

The ECU 28A is a position recognition unit configured to recognize the current position or the route of the vehicle V. The ECU 28A performs control of a gyro sensor 33A, a GPS sensor 28b, and a communication device 28c and information processing of a detection result or a communication result. The gyro sensor 33A detects the rotary motion of the vehicle V. The route of the vehicle V can be determined based on the detection result of the gyro sensor 33A, and the like. The GPS sensor 28b detects the current position of the vehicle V. The communication device 28c performs wireless communication with a server configured to provide map information and traffic information, and acquires these pieces of information. A database 28a can store accurate map information. The ECU 28A can more accurately specify the position of the vehicle V on a lane based on the map information and the like.

An input device 45A is arranged in the vehicle such that the driver can operate it, and accepts input of an instruction or information from the driver.

Control Apparatus 1B

The arrangement of the control apparatus 1B will be described with reference to FIG. 2. The control apparatus 1B includes an ECU group (control unit group) 2B. The ECU group 2B includes a plurality of ECUs 21B to 25B. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIGS. 2 and 3, the names of the representative functions of the ECUs 21B to 25B are given, like the ECU group 2A.

The ECU 21B is an environment recognition unit configured to recognize the traveling environment of the vehicle V based on the detection results of detection units 31B and 32B that detect the peripheral situation of the vehicle V, and also serves as a traveling support unit configured to execute control associated with traveling support (in other words, driving support) as traveling control of the vehicle V. The ECU 21B generates target data (to be described later) as peripheral environment information.

Note that in this embodiment, the ECU 21B has the environment recognition function and the traveling support function. However, an ECU may be provided for each function, like the ECU 21A and the ECU 29A of the control apparatus 1A. Reversely, in the control apparatus 1A, the functions of the ECU 21A and the ECU 29A may be implemented be one ECU, like the ECU 21B.

In this embodiment, the detection unit 31B is an image capturing device (to be sometimes referred to as the camera 31B hereinafter) configured to detect an object around the vehicle V by image capturing. The camera 31B is provided at the roof front of the vehicle V to capture the front side of the vehicle V. When images captured by the camera 31B are analyzed, the contour of a target or a division line (a white line or the like) of a lane on a road can be extracted. In this embodiment, the detection unit 32B is a millimeter wave radar (to be sometimes referred to as the radar 32B hereinafter) configured to detect an object around the vehicle V by a radio wave, and detects a target around the vehicle V or measures the distance to a target. In this embodiment, five radars 32B are provided; one at the center of the front portion of the vehicle V, one at each corner of the front portion, and one at each corner of the rear portion. The number of radars 32B and their arrangement can appropriately be selected.

The ECU 22B is a steering control unit configured to control the electric power steering device 41B. The electric power steering device 41B includes a mechanism that steers the front wheels in accordance with the driving operation (steering operation) of the driver on the steering wheel ST. The electric power steering device 41B includes a motor that generates a driving force to assist the steering operation or automatically steer the front wheels, a sensor that detects the rotation amount of the motor, a torque sensor that detects the steering torque on the driver, and the like. In addition, a steering angle sensor 37 is electrically connected to the ECU 22B via a communication line L2 to be described later, and the electric power steering device 41B can be controlled based on the detection result of the steering angle sensor 37. The ECU 22B can acquire the detection result of a sensor 36 that detects whether the driver is gripping the steering handle ST, and can monitor the gripping state of the driver.

The ECU 23B is a braking control unit configured to control a hydraulic device 42B. A braking operation of the driver on the brake pedal BP is converted into a fluid pressure by the brake master cylinder BM and transmitted to the hydraulic device 42B. The hydraulic device 42B is an actuator capable of controlling, based on the fluid pressure transmitted from the brake master cylinder BM, the fluid pressure of hydraulic oil to be supplied to the brake device 51 of each wheel. The ECU 23B performs driving control of a solenoid valve and the like provided in the hydraulic device 42B.

In this embodiment, a wheel speed sensor 38 provided in each of the four wheels, a yaw rate sensor 33B, and a pressure sensor 35 configured to detect the pressure in the brake master cylinder BM are electrically connected to the ECU 23B and the hydraulic device 42B, and based on the detection results of these, an ABS function, traction control, and the posture control function for the vehicle V are implemented. For example, the ECU 23B adjusts the braking force of each wheel based on the detection result of the wheel speed sensor 38 provided in each of the four wheels, thereby suppressing skid of each wheel. In addition, the ECU 23B adjusts the braking force of each wheel based on the rotation angular speed about the vertical axis of the vehicle V detected by the yaw rate sensor 33B, thereby suppressing an abrupt posture change of the vehicle V.

The ECU 23B also functions as an external alarm control unit configured to control an information output device 43B that alarms information outside the vehicle. In this embodiment, the information output device 43B is a brake lamp, and the ECU 23B can light the brake lamp at the time of braking or the like. This can increase the attention of a following vehicle to the vehicle V.

The ECU 24B is a stop maintaining control unit configured to control an electric parking brake device (for example, a drum brake) 52 provided in each rear wheel. The electric parking brake device 52 includes a mechanism that locks the rear wheel. The ECU 24B can control lock and unlock of the rear wheels by the electric parking brake devices 52.

The ECU 25B is an in-vehicle alarm control unit configured to control an information output device 44B that alarms information in the vehicle. In this embodiment, the information output device 44B includes a display device arranged on the instrument panel. The ECU 25B can cause the information output device 44B to output various kinds of information such as a vehicle speed and fuel consumption.

An input device 45B is arranged in the vehicle such that the driver can operate it, and accepts input of an instruction or information from the driver.

Communication Lines

An example of communication lines of the control system 1, which communicably connect the ECUs, will be described with reference to FIG. 3. The control system 1 includes communication lines L1 to L7 of wired communication. The ECUs 20A to 27A and 29A of the control apparatus 1A are connected to the communication line L1. Note that the ECU 28A may also be connected to the communication line L1.

The ECUs 21B to 25B of the control apparatus 1B are connected to the communication line L2. The ECU 20A of the control apparatus 1A is also connected to the communication line L2. The communication line L3 connects the ECU 20A and the ECU 21B. The communication line L5 connects the ECU 20A, the ECU 21A, and the ECU 28A. The communication line L6 connects the ECU 29A and the ECU 21A. The communication line L7 connects the ECU 29A and the ECU 20A.

The protocols of the communication lines L1 to L7 may be identical or different, and may be changed in accordance with the communication environment such as a communication speed, a communication amount, and durability. For example, the communication lines L3 and L4 may be Ethernet® from the viewpoint of communication speed. For example, the communication lines L1, L2, and L5 to L7 may be CAN.

The control apparatus 1A includes a gateway GW. The gateway GW relays the communication line L1 and the communication line L2. For this reason, for example, the ECU 21B can output a control instruction to the ECU 27A via the communication line L2, the gateway GW, and the communication line L1.

Power Supply

The power supply of the control system 1 will be described with reference to FIG. 3. The control system 1 includes a large capacity battery 6, a power supply 7A, and a power supply 7B. The large capacity battery 6 is a battery used to drive the motor M and charged by the motor M.

The power supply 7A is a power supply that supplies power to the control apparatus 1A, and includes a power supply circuit 71A and a battery 72A. The power supply circuit 71A is a circuit that supplies the power of the large capacity battery 6 to the control apparatus 1A, and, for example, lowers the output voltage (for example, 190 V) of the large capacity battery 6 to a reference voltage (for example, 12 V). The battery 72A is a lead battery of, for example, 12 V. Since the battery 72A is provided, the power can be supplied to the control apparatus 1A even in a case in which the power supply of the large capacity battery 6 or the power supply circuit 71A is shut down or lowers.

The power supply 7B is a power supply that supplies power to the control apparatus 1B, and includes a power supply circuit 71B and a battery 72B. The power supply circuit 71B is a circuit that is similar to the power supply circuit 71A and supplies the power of the large capacity battery 6 to the control apparatus 1B. The battery 72B is a battery similar to the battery 72A, and is a lead battery of, for example, 12 V. Since the battery 72B is provided, the power can be supplied to the control apparatus 1B even in a case in which the power supply of the large capacity battery 6 or the power supply circuit 71B is shut down or lowers.

Redundancy

Functions common to the control apparatus 1A and the control apparatus 1B will be described. When the same functions are made redundant, the reliability of the control system 1 can be improved. In addition, some redundant functions provide different functions, instead of multiplexing the same functions. This suppresses an increase in cost caused by the redundancy of functions.

Actuator System

○ Steering

The control apparatus 1A includes the electric power steering device 41A and the ECU 22A that controls this. The control apparatus 1B also includes the electric power steering device 41B and the ECU 22B that controls this.

○ Braking

The control apparatus 1A includes the hydraulic device 42A and the ECU 23A that controls this. The control apparatus 1B includes the hydraulic device 42B and the ECU 23B that controls this. All of these can be used for braking of the vehicle V. On the other hand, the main function of the braking mechanism of the control apparatus 1A is the distribution of the braking force by the brake device 51 and the braking force by the regenerative braking of the motor M. On the other hand, the main function of the braking mechanism of the control apparatus 1B is posture control and the like. Although the functions are common concerning braking, functions different from each other are provided.

○ Stop Maintaining

The control apparatus 1A includes the electric parking lock device 50a and the ECU 24A that controls this. The control apparatus 1B includes the electric parking brake device 52 and the ECU 24B that controls this. All of these can be used to maintain the stop of the vehicle V. On the other hand, although the electric parking lock device 50a is a device that functions when the P range of the automatic transmission TM is selected, the electric parking brake device 52 is a device that locks a rear wheel. Although the functions are common concerning stop maintaining of the vehicle V, functions different from each other are provided.

○ In-Vehicle Alarm

The control apparatus 1A includes the information output device 43A and the ECU 25A that controls this. The control apparatus 1B includes the information output device 44B and the ECU 25B that controls this. All of these can be used to alarm the driver of information. On the other hand, the information output device 43A is, for example, a head-up display, and the information output device 44B is a display device such as a measuring instrument. Although the functions are common concerning in-vehicle alarm, display devices different from each other can be employed.

○ External Alarm

The control apparatus 1A includes the information output device 44A and the ECU 26A that controls this. The control apparatus 1B includes the information output device 43B and the ECU 23B that controls this. All of these can be used to alarm information outside the vehicle. On the other hand, the information output device 43B is a direction indicator (hazard lamp), and the information output device 43B is a brake lamp. Although the functions are common concerning external alarm, functions different from each other are provided.

○ Different Points

The control apparatus 1A includes the ECU 27A that controls the power plant 50. However, the control apparatus 1B does not include a unique ECU that controls the power plant 50. In this embodiment, both the control apparatuses 1A and 1B can solely perform steering, braking, and stop maintaining. Hence, even if the control apparatus 1A or control apparatus 1B suffers performance degradation, power supply shutdown, or communication interruption, it is possible to decelerate and maintain the stop state while suppressing lane departure. Additionally, as described above, the ECU 21B can output a control instruction to the ECU 27A via the communication line L2, the gateway GW, and the communication line L1, and the ECU 21B can also control the power plant 50. Since the control apparatus 1B does not include a unique ECU that controls the power plant 50, an increase in cost can be suppressed. However, the control apparatus 1B may include a unique ECU.

Sensor System

○ Detection of Peripheral Situation

The control apparatus 1A includes the detection units 31A and 32A. The control apparatus 1B includes the detection units 31B and 32B. All of these can be used to recognize the traveling environment of the vehicle V. On the other hand, the detection unit 32A is a lidar, and the detection unit 32B is a radar. The lidar is generally advantageous in detecting a shape. Additionally, the radar is generally more advantageous than the lidar from the viewpoint of cost. When these sensors of different characteristics are used, it is possible to improve target recognition performance and reduce the cost. Both the detection units 31A and 31B are cameras. Cameras of different characteristics may be used. For example, one of them may be a camera of a resolution higher than the other. In addition, the angles of view may be different from each other.

As for comparison of the control apparatus 1A and the control apparatus 1B, the detection characteristics of the detection units 31A and 32A may be different from those of the detection units 31B and 32B. In this embodiment, the detection unit 32A is a lidar whose target edge detection performance is higher than that of the radar (detection unit 32B) in general. Additionally, the radar is generally excellent in the relative speed detection accuracy or weatherability as compared to the lidar.

In addition, if the camera 31A has a resolution higher than that of the camera 31B, the detection performance of the detection units 31A and 32A is higher than that of the detection units 31B and 32B. When the plurality of sensors of different detection characteristics and costs are combined, cost advantage can sometimes be obtained in the whole system. In addition, when the sensors of different detection characteristics are combined, detection omission or detection errors can be reduced as compared to a case in which redundancy is attained by identical sensors.

○ Vehicle Speed

The control apparatus 1A includes the rotation speed sensor 39. The control apparatus 1B includes the wheel speed sensor 38. Both can be used to detect the vehicle speed. On the other hand, the rotation speed sensor 39 detects the rotation speed of the output shaft of the automatic transmission TM, and the wheel speed sensor 38 detects the rotation speed of the wheels. Although the sensors are common concerning the capability of detecting the vehicle speed, the detection targets are different from each other.

○ Yaw Rate

The control apparatus 1A includes the gyro sensor 33A. The control apparatus 1B includes the yaw rate sensor 33B. Both can be used to detect the angular velocity about the vertical axis of the vehicle V. On the other hand, the gyro sensor 33A is used to determine the route of the vehicle V, and the yaw rate sensor 33B is used for posture control of the vehicle V, and the like. Although the sensors are common concerning the capability of detecting the angular velocity of the vehicle V, the use purposes are different from each other.

○ Steering Angle and Steering Torque

The control apparatus 1A includes a sensor that detects the rotation amount of the motor of the electric power steering device 41A. The control apparatus 1B includes the steering angle sensor 37. Both can be used to detect the steering angle of the front wheels. In the control apparatus 1A, an increase in cost can be suppressed by using the sensor that detects the rotation amount of the motor of the electric power steering device 41A, instead of additionally providing the steering angle sensor 37. However, the steering angle sensor 37 may additionally be provided in the control apparatus 1A.

In addition, when both the electric power steering devices 41A and 41B include torque sensors, the steering torque can be recognized in both the control apparatuses 1A and 1B.

○ Braking Operation Amount

The control apparatus 1A includes the operation detection sensor 34b. The control apparatus 1B includes the pressure sensor 35. Both can be used to detect the braking operation amount of the driver. On the other hand, the operation detection sensor 34b is used to control the distribution of the braking force by the four brake devices 51 and the braking force by regenerative braking of the motor M, and the pressure sensor 35 is used for posture control and the like.

Although the sensors are common concerning detection of the braking operation amount, the use purposes are different from each other.

Power Supply

The control apparatus 1A receives power supply from the power supply 7A, and the control apparatus 1B receives power supply from the power supply 7B. Since the power is supplied to any one of the control apparatuses 1A and 1B even in a case in which the power supply of one of the power supply 7A and the power supply 7B is shut down or lowers, it is possible to more reliably ensure the power supply and improve the reliability of the control system 1. If the power supply of the power supply 7A is shut down or lowers, it is difficult to perform communication between the ECUs via the gateway GW provided in the control apparatus 1A. However, in the control apparatus 1B, the ECU 21B can communicate with the ECUs 22B to 24B and 44B via the communication line L2.

Redundancy in Control Apparatus 1A

The control apparatus 1A includes the ECU 20A that performs automated driving control, and the ECU 29A that performs traveling support control. That is, the control apparatus 1A includes two control units configured to perform traveling control.

Examples of Control Functions

Control functions executable by the control apparatus 1A or 1B include traveling-associated functions associated with control of driving, braking, and steering of the vehicle V, and alarm functions associated with an alarm of information to the driver.

Examples of traveling-associated functions are lane maintaining control, lane departure suppression control (lane deviation suppression control), lane change control, preceding vehicle follow-up control, collision reduction brake control, and erroneous start suppression control. Examples of the alarm functions are adjacent vehicle alarm control and preceding vehicle start alarm notification control.

Figure 6A:
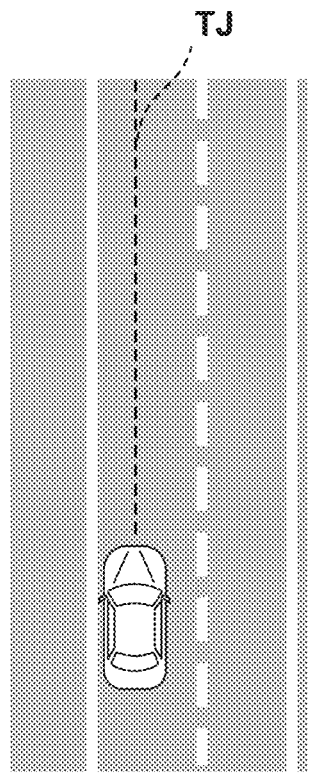
FIG. 6A is a view for explaining a lane maintaining operation.
Figure 6B:
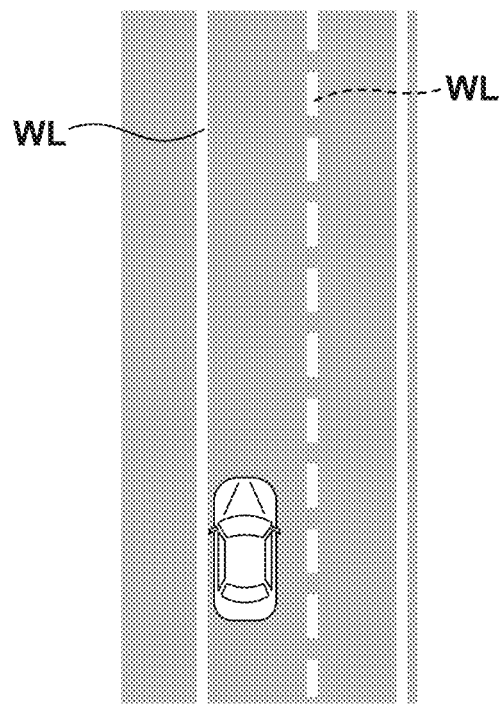
FIG. 6B is a view for explaining the lane maintaining operation.

Lane maintaining control is one of control processes for the position of the vehicle with respect to a lane. This control makes the vehicle travel automatically (without depending on the driving operation of the driver) on a traveling track TJ set in a lane, as schematically shown in FIG. 6A. Lane departure suppression control is one of control processes for the position of the vehicle with respect to a lane. As schematically shown in FIG. 6B, a white line or a median strip WL is detected, and steering is automatically performed so the vehicle does not pass across the line WL. As described above, lane departure suppression control and lane maintaining control are different functions.

Lane change control is control of automatically moving the vehicle from the lane on which the vehicle is traveling to an adjacent lane. Preceding vehicle follow-up control is control of automatically following another vehicle traveling ahead of the self-vehicle. Collision reduction brake control is control of automatically braking the vehicle and supporting collision avoidance in a case in which the possibility of collision against an obstacle ahead of the vehicle rises. Erroneous start suppression control is control of limiting acceleration of the vehicle in a vehicle stop state in a case in which the acceleration operation by the driver is a predetermined amount or more, and suppresses abrupt start.

Adjacent vehicle alarm control is control of alarming the driver of the presence of another vehicle traveling on the adjacent lane adjacent to the traveling lane of the self-vehicle. The driver is alarmed of, for example, the presence of another vehicle traveling on a side or on a rear side of the self-vehicle. Preceding vehicle start alarm control is control of alarming that the self-vehicle and another vehicle ahead are in a stop state, and another vehicle ahead has started. These alarms can be made by the above-described in-vehicle alarm devices (the information output device 43A and the information output device 44B).

The ECU 20A, the ECU 29A, and the ECU 21B can share and execute these functions. Which control function is to be assigned to which ECU can appropriately be selected.

Outline of Control

Control according to the present invention will be described below. As described above, the present invention considers that on a snowy road or the like, when a certain vehicle performs lane change (cut-in) from the lane on which it is currently traveling to an adjacent lane, the snow is whirled up, and the snow that is whirled up affects another vehicle traveling side by side or in the neighborhood of the vehicle that has changed the lane. More specifically, a vehicle that supports automated driving includes a plurality of detection means, as described above. Depending on the characteristics of the detection means, the detection accuracy lowers due to the whirled snow. In particular, when the amount of whirled snow is enormous, detection by the detection means does not function at all, and automated driving itself is impossible.

Figure 7:
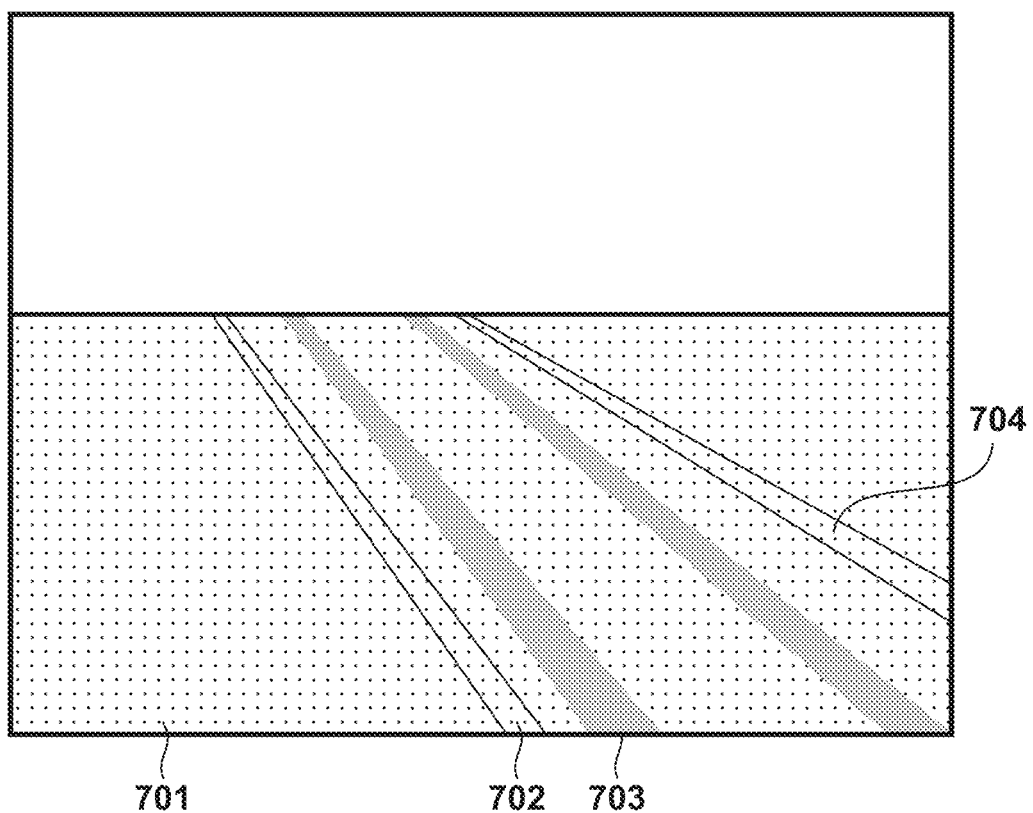
FIG. 7 is a view for explaining a road surface state on a snowy road.

FIG. 7 is a view showing an example of a road surface state assumed in an embodiment of the present invention. A state in which snow is accumulated on a road, and wheel tracks are formed in part thereof is shown here. On the road, the snow is accumulated on white lines 702 and 704. Additionally, the snow is also accumulated on a portion 701 outside the white line 702. Wheel tracks 703 of a vehicle that has previously traveled are formed on the road surface (lane).

Figure 8:
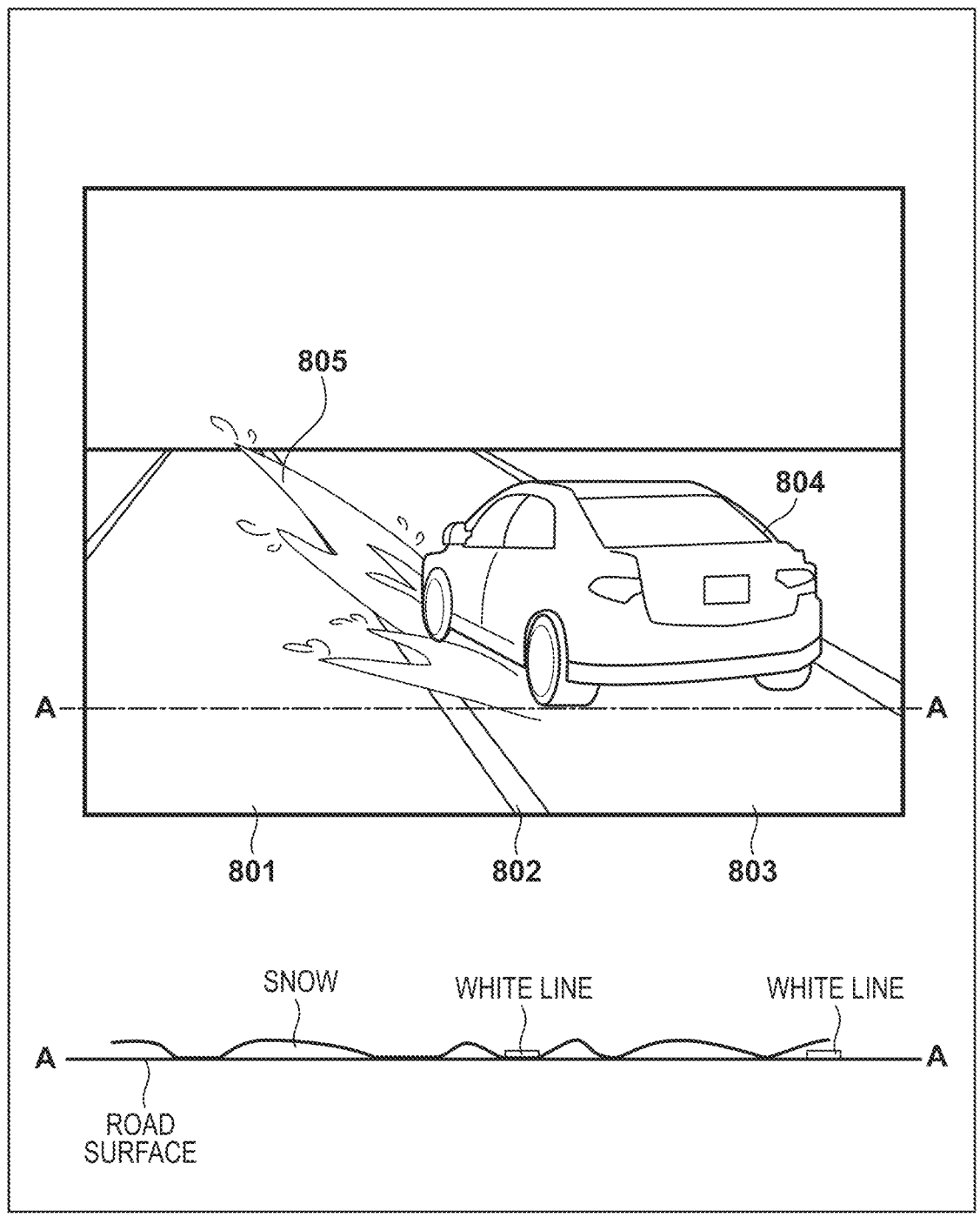
FIG. 8 is a view for explaining snow swirling by another vehicle on a snowy road.

FIG. 8 shows an example in which snow swirling occurs in the state as shown in FIG. 7. In FIG. 8, another vehicle 804 is traveling on the front side of an adjacent lane 803, and snow is accumulated between the lanes (near the position of a white line 802). If the vehicle 804 performs lane change (cut-in) from the lane 803 to a lane 801 on which the self-vehicle is traveling, snow whirling 805 occurs, as shown in FIG. 8. At this time, the amount of snow swirling varies depending on the snow accumulation amount, the traveling speed of the vehicle, and the like. In addition, the range that the whirled snow affects on the lane on which the self-vehicle is traveling also varies in accordance with these conditions.

An example of the state of snow accumulation on the road horizontally viewed is shown in the lower portion of FIG. 8. That is, the amount of snow accumulated on the road is not necessarily even, and a different amount of snow is sometimes accumulated depending on the position on the lane.

In the present invention, control concerning automated driving is performed to avoid such a situation. The vehicle according to an embodiment of the present invention includes a plurality of detection means, as described above, and a plurality of types of detection means are provided in accordance with the detection target or the like. Although not all types of detection means are affected by snow or the like, a description will be made assuming that the sensing result of at least one type of detection means is affected by snow or the like.

Control Procedure

A control procedure according to this embodiment will be described with reference to FIGS. 4 and 5. Note that this processing is implemented when the ECUs execute a predetermined program and cooperate with the above-described control units. In addition, the vehicle according to this embodiment can switch between automated driving and normal driving (manual driving), and a description will be made here assuming that control is performed in a state in which automated driving is performed. Note that the control to be described below is not limited to control by one of the control apparatuses 1A and 1B, and an explanation will be made here by comprehensively describing the subject of processing as a control apparatus 1.

In step S401, the control apparatus 1 acquires road surface information during traveling based on the detection results of the detection means. The road surface information acquired at this time includes the range of the lane on which the self-vehicle is traveling, the road surface state, and the like. In addition, not only the information of the lane on which the self-vehicle is traveling but also the information of an adjacent lane (including an opposite lane) may be acquired.

In step S402, the control apparatus 1 determines, based on the information acquired in step S401, whether the vehicle is traveling on a road surface with snow (to be referred to as a snowy road hereinafter). The determination here is not limited to the whole lanes, and a case in which snow is accumulated between lanes or on a white line may be included. For example, if snowfall is detected based on an image acquired by a camera, and no white line can be detected on the road surface, it may be determined that the vehicle is traveling on a snowy road. If it is determined that the road is a snowy road (YES in step S402), the process advances to step S403. If it is determined that the road is not a snowy road (NO in step S402), automated driving is continued, and the processing procedure is ended.

In step S403, the control apparatus 1 transitions to a mode (to be referred to as a snowy road mode hereinafter) to travel on a snowy road. Note that the snowy road mode here is changing of settings corresponding to subsequent control, and is not particularly limited. At this time, the user may be notified that the automated driving is changed to the snowy road mode.

In step S404, the control apparatus 1 collects the information of other traveling vehicles based on the detection results of the detection means. The information of other vehicles collected here includes not only the information of vehicles traveling on the front, right, and left sides of the lane on which the self-vehicle is traveling but also the information of vehicles traveling on an adjacent lane (including an opposite lane). In a case of traveling on a road constituted by three or more lanes, the information of vehicles traveling on a lane next to the adjacent lane may be acquired.

In step S405, the control apparatus 1 performs cut-in determination processing based on the information collected in step S404. The cut-in determination processing here is processing of predicting whether another vehicle cuts in to the lane on which the self-vehicle is traveling, and details will be described later with reference to FIG. 5.

In step S406, the control apparatus 1 determines whether it is predicted by the cut-in determination processing of step S405 that cut-in is to be performed. If it is predicted that cut-in is to be performed (YES in step S406), the process advances to step S407. If it is predicted that cut-in is not to be performed (NO in step S406), the process returns to step S404 to repeat the processing.

In step S407, the control apparatus 1 performs alternate control. As the alternate control here, for the purpose of increasing the distance from the other vehicle that has cut in, the traveling speed is reduced, and offset traveling from the lane on the cut-in side is performed. The variation amount of the speed or the moving amount of the offset in this control can be decided based on, for example, the distance or relative speed between the self-vehicle and the other vehicle at that point of time, the amount (predicted amount) of snow accumulated on the road surface, and the like. An example of alternate control will be described later with reference to FIGS. 9 and 10.

In step S408, the control apparatus 1 determines whether the cut-in of the other vehicle that has cut in is ended. The determination here may be done based on the left and right moving operation (variation amount) of the other vehicle, the output of a blinker, and the like. If it is determined that the cut-in is ended (YES in step S408), the process advances to step S409. If it is determined that the cut-in is not ended (NO in step S408), the process returns to step S407 to continue the alternate control.

In step S409, the control apparatus 1 performs reproduction control to reproduce the state before the alternate control is performed in step S407. As the reproduction control, for example, if the traveling speed of the self-vehicle is reduced as the alternate control, the speed may be returned to that before the alternate control. If offset traveling is performed, control may be done to return to the original traveling position in the lane. Note that the reproduction control here is not necessarily performed to return to the state before the alternate control, and control need only be done to obtain an appropriate automated driving state at that point of time. After the reproduction control, the process returns to step S404 to continue the control.

Note that the road surface information may be acquired at a correct time, the determination of step S402 may be performed at an appropriate timing (at a predetermined interval), and the mode may be switched to normal automatic traveling when it is determined that the road is not a snowy road. In addition, based on an instruction from the user at an arbitrary timing, the mode may be switched to a normal operation mode (manual driving), and automated driving may be ended.

Cut-In Determination Processing

Cut-in determination processing based on the information of other vehicles and road surface information in step S405 of FIG. 4 will be described with reference to FIG. 5.

In step S501, the control apparatus 1 determines, based on the information of other vehicles acquired by the detection means, whether another vehicle exists on an adjacent lane (including an opposite lane). If it is determined that another vehicle exists (YES in step S501), the process advances to step S502. If it is determined that another vehicle does not exist (NO in step S501), the process advances to step S506.

In step S502, the control apparatus 1 determines, based on the information of the other vehicle, whether the other vehicle is performing a preliminary operation assumed to be an operation for cut-in. Examples of the preliminary operation here are blinking of the blinker, a left-right direction movement to the self-lane side, approach to the lane on which the self-vehicle is traveling. If it is determined that the preliminary operation is being performed (YES in step S502), the process advances to step S503. If it is determined that the preliminary operation is not being performed (NO in step S502), the process advances to step S506. In addition, if it is already detected at this point of time that snow swirling by the other vehicle occurs, it may be determined that the preliminary operation is being performed.

In step S503, the control apparatus 1 determines whether the distance between the self-vehicle and the other vehicle is equal to or less than a predetermined value. The distance here may be a distance in the advancing direction, or may be a distance in the left-right direction. Alternatively, both distances may be taken into consideration. In addition, the predetermined value used here may be a predetermined fixed value, or may be decided in accordance with the traveling speed of each vehicle, the relative speed, and the like. If the distance is equal to or less than the predetermined value (YES in step S503), the process advances to step S504. If the distance is larger than the predetermined value (NO in step S503), the process advances to step S506.

In step S504, the control apparatus 1 determines, based on peripheral road surface information acquired by the detection means, whether the snow accumulation amount is equal to or more than a predetermined amount. The snow accumulation amount here may be determined based on, for example, the state (thickness, position, and the like) of snow on the road surface, the information of the amount of precipitation acquired via the communication device 28c, and the like. In addition, the predetermined amount used here may be a predetermined fixed value, or may be decided in accordance with the traveling speed of each vehicle, the relative speed, and the like. If the snow accumulation amount is equal to or more than the predetermined amount (YES in step S504), the process advances to step S505. If the snow accumulation amount is less than the predetermined amount (NO in step S504), the process advances to step S506. Note that a non-detection ratio on the road surface may be used in addition to or in place of the snow accumulation amount. For example, the ratio of a road surface portion (for example, a black portion) to a snow portion (for example, a white region or a region of a close color) is calculated based on the peripheral road surface information, and the result is compared as a non-detection ratio on the road surface, with a threshold, thereby performing the determination.

In step S505, the control apparatus 1 predicts that cut-in by the other vehicle occurs. Then, the processing procedure is ended.

In step S506, the control apparatus 1 predicts that cut-in by the other vehicle does not occur. Note that a case in which cut-in occurs but does not affect the self-vehicle is also included in the prediction of this process. Then, the processing procedure is ended.

Alternate Control

Alternate control performed in step S407 of FIG. 4 will be described here. As described above, in the present invention, when another vehicle cuts in to the lane on which the self-vehicle is traveling on a snowy road or the like, and the snow on the road surface is swirled, the influence of the snow on the detection means is suppressed. In this embodiment, alternate control is performed as automated driving control of the self-vehicle when cut-in by another vehicle is performed.

In this embodiment, as examples of alternate control, the following control can be performed to increase the distance from another vehicle.

Deceleration of the self-vehicle
  Movement in the direction opposite to the other vehicle side (offset traveling)
  Lane change (when another lane exists in the direction opposite to the other vehicle side)
  Switching of the driving mode
    Switching from automated driving to normal driving (manual driving)
    Change of the level of automated driving (for example, a change from level 3 to level 2)

Note that the alternate control is not limited to one of the above controls, and the control may be done by combining them. In addition, the variation amount (for example, a deceleration amount or an offset amount) may be decided based on the distance or relative speed between the self-vehicle and the other vehicle or environmental information. In addition, when performing alternate control, if snow swirling by the other vehicle is detected, the range (width) of the influence of the swirling may be specified, and an offset amount may be decided to avoid the range.

Figure 4:
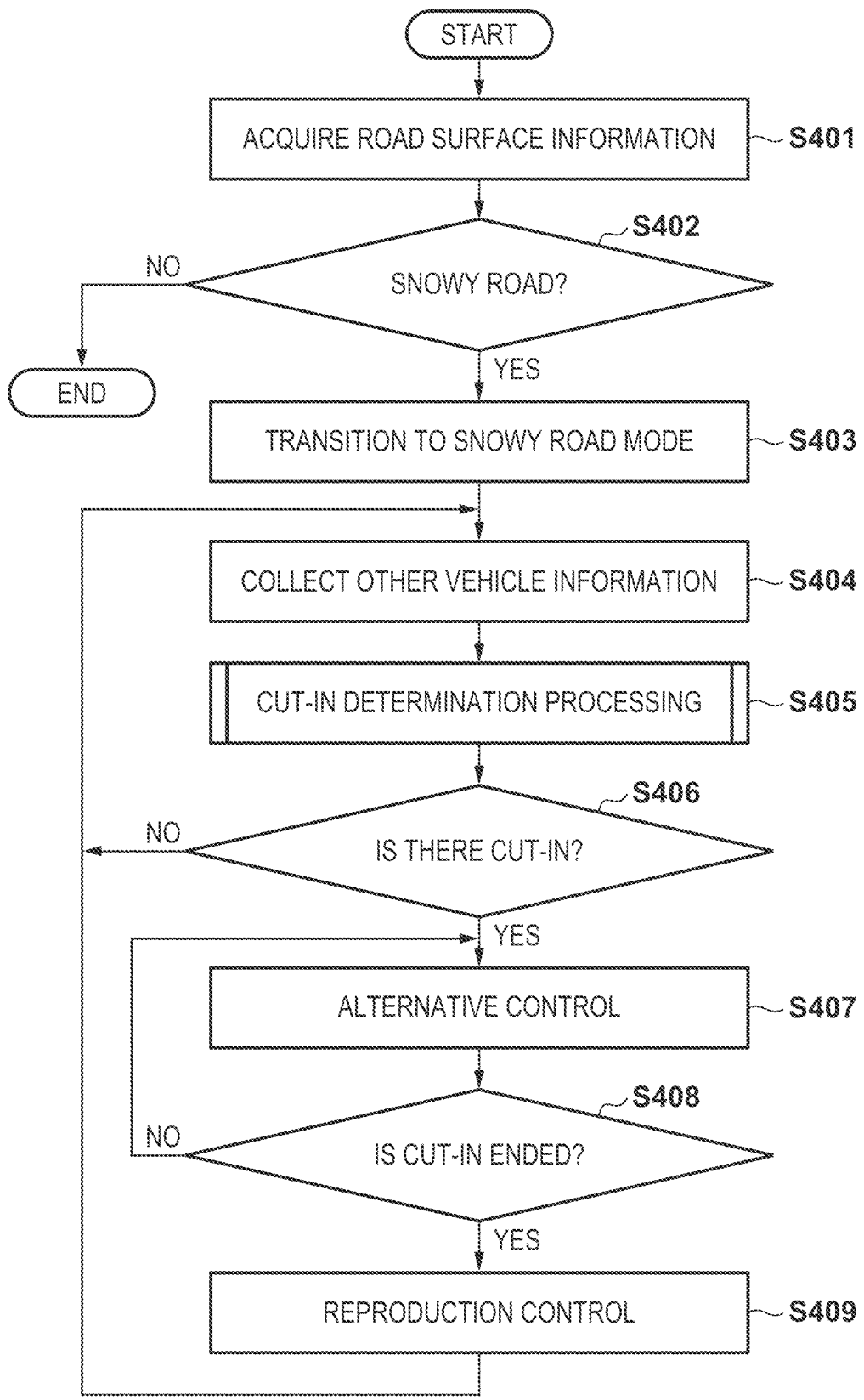
FIG. 4 is a flowchart of control according to an embodiment of the present invention.
Figure 5:
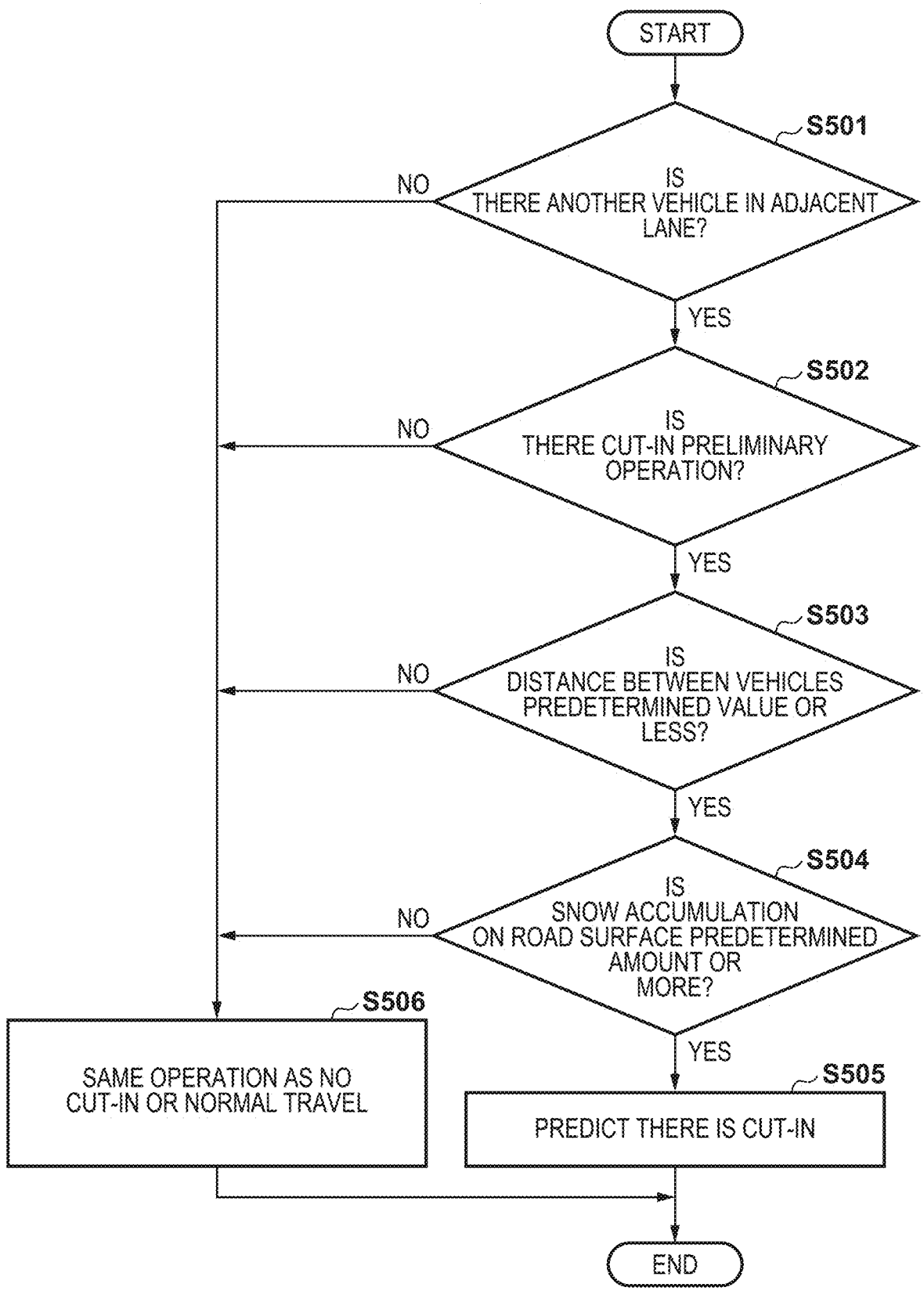
FIG. 5 is a flowchart of control according to an embodiment of the present invention.

Furthermore, reproduction control for the alternate control is performed in the process of step S409 of FIG. 4. The variation amount at the time of alternate control may be stored, and reproduction control may be performed based on the variation amount. In addition, automated driving may be controlled based on environmental information at that point of time without considering the variation amount in alternate control.

Additionally, the priority may be switched between control in the longitudinal direction (speed change) and control in the lateral direction (offset traveling) in accordance with the information of vehicles (including both the self-vehicle and the other vehicle) and environmental information. For example, since control in the lateral direction is risky (slip on a snowy or icy road) depending on the state of the road surface, control in the longitudinal direction may preferentially be performed. Furthermore, if the following vehicle is close, or visibility is poor, control in the lateral direction may preferentially be performed rather than changing the speed.

Figure 9:
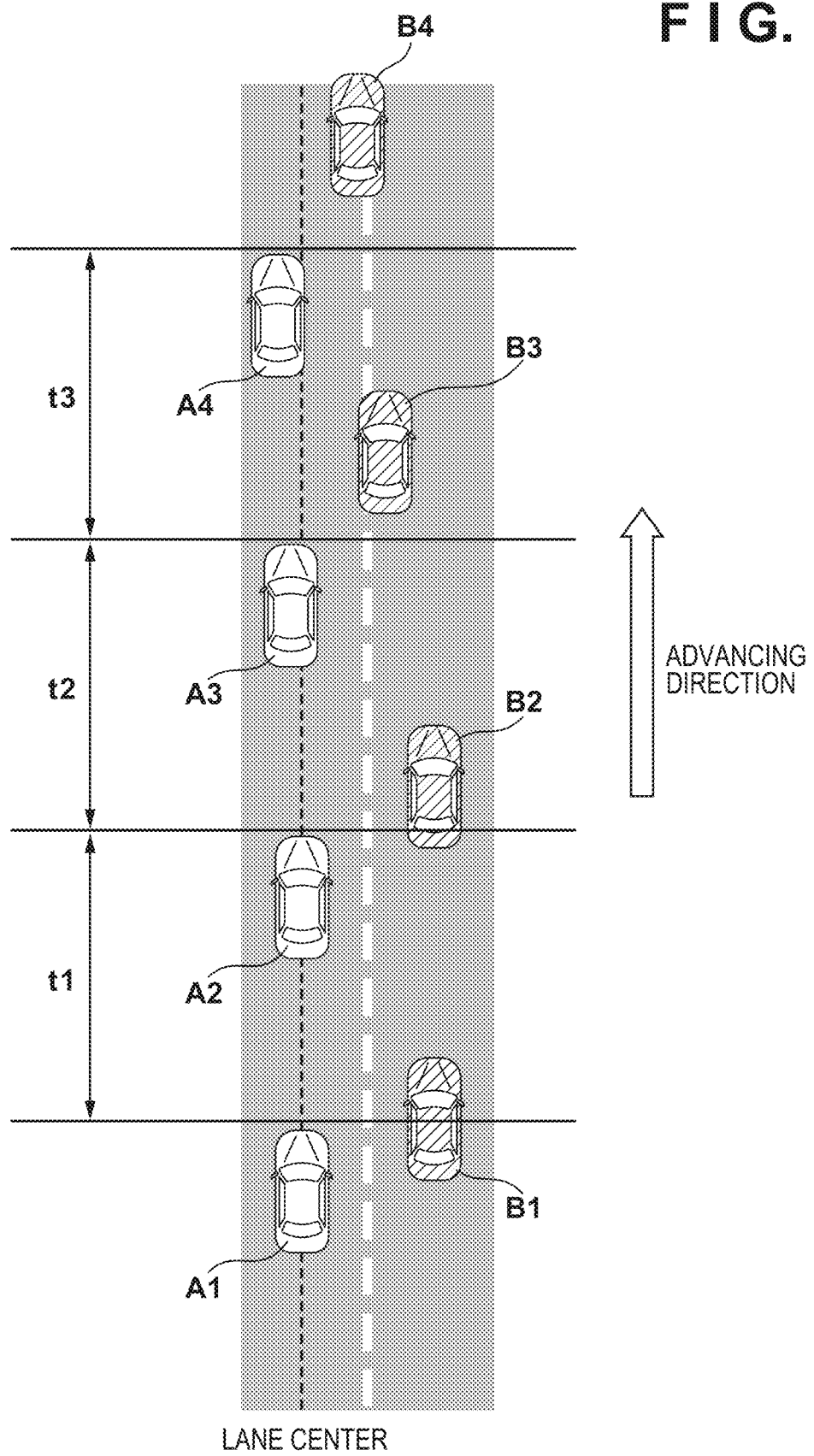
FIG. 9 is a conceptual view for explaining control of avoiding snow swirling according to the present invention.
Figure 10:
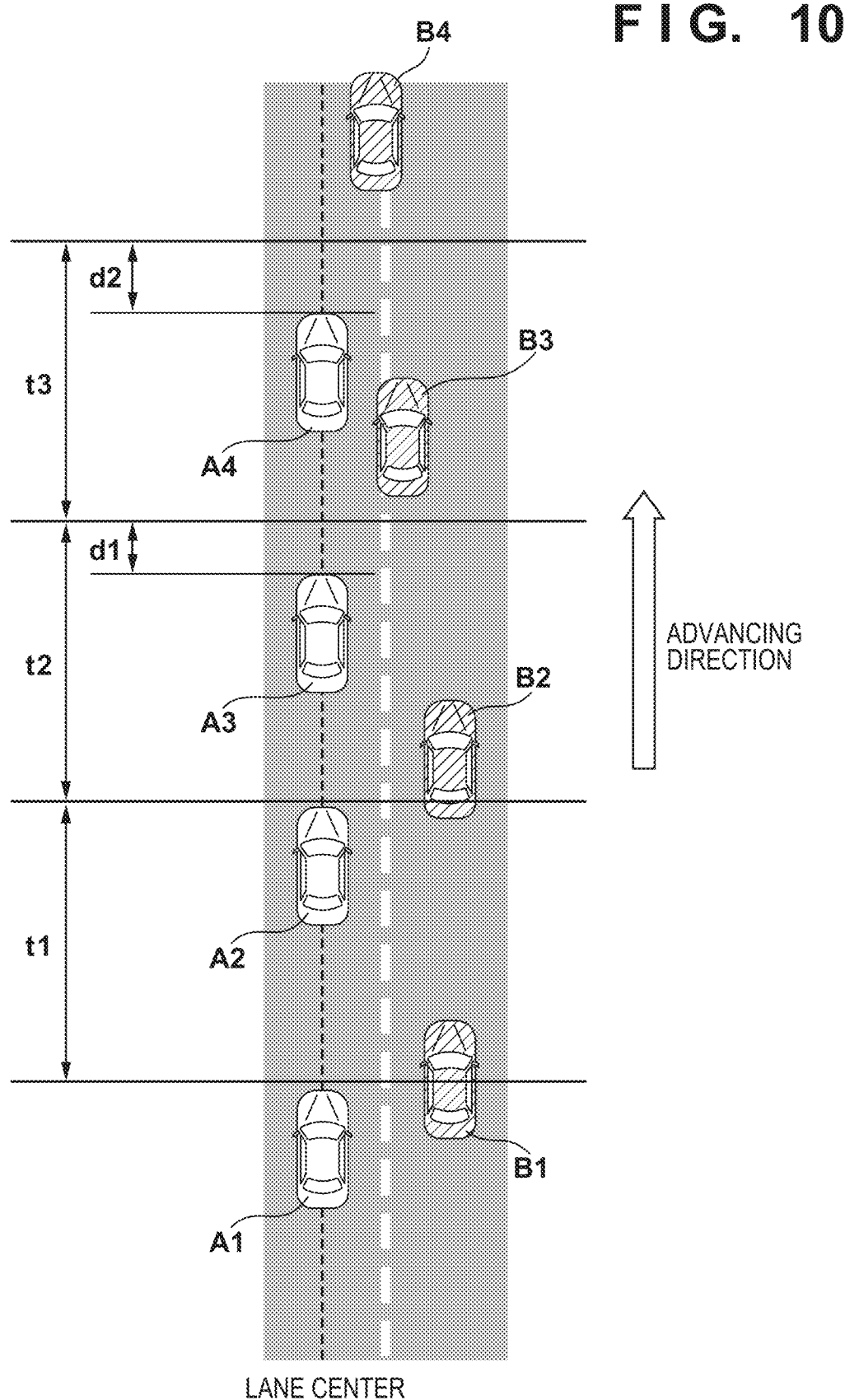
FIG. 10 is a conceptual view for explaining control of avoiding snow swirling according to the present invention.

FIGS. 9 and 10 are views showing examples of alternate control in an embodiment of the present invention. Examples in which a vehicle A and the vehicle B are traveling on a road with two lanes are shown. Suffixes representing the vehicles indicate the positional relationship at the same time. For example, a vehicle A3 and a vehicle B3 indicate the positional relationship at the same time. In addition, t represents the same time interval.

FIG. 9 is a view showing an example in which the vehicle A performs offset traveling from the lane center when the vehicle B cuts in from the adjacent lane. In the case shown in FIG. 9, the vehicle B cuts in from the right side, and the vehicle A performs offset traveling in the direction opposite to the cut-in side so as not to be affected by snow upon cut-in. Accordingly, the vehicle A travels such that the distance between the vehicles increases. In the case shown in FIG. 9, the speed of the self-vehicle is not changed.

FIG. 10 is a view showing an example in which the vehicle A decelerates when the vehicle B cuts in from the adjacent lane. In the case shown in FIG. 10, if it is determined that the vehicle B cuts in, control is performed to increase the distance in the advancing direction from the vehicle B that has cut in so as not to be affected by snow upon cut-in. Each of d1 and d2 represents the difference from a position reached when the vehicle A travels without changing the speed.

Other Embodiments

In the above embodiment, processing assuming a snowy road has been described. However, the present invention is not limited to this. For example, alternate control may be performed by predicting cut-in even on a road other than a snowy road. In this case, since snow swirling does not occur, control may be performed such that the degree of alternate control is lowered as compared to a snowy road. This can maintain the feeling of safety of the occupant against cut-in in automated driving.

As shown in step S403 of FIG. 4, in this embodiment, if it is determined, when performing automated driving control, that the vehicle is traveling on a snowy road, control to change the mode to the snowy road mode is performed. In the snowy road mode, various kinds of control may be performed in addition to the control in the above-described processing procedure.

In the above-described embodiment, alternate control is performed based on the preliminary operation for cut-in and the snow accumulation state on the road surface. However, the present invention is not limited to this. If snow swirling by another vehicle traveling on the adjacent lane is detected before the preliminary operation for cut-in is performed, alternate control may be performed to avoid the range where the snow is swirled.

For example, the user may be notified that the vehicle is traveling on a snowy road. Even if the control shown in FIG. 4 is performed, the influence of snow swirling in cut-in on the detection means cannot always be eliminated. Hence, if there is certain influence, a notification representing transition to the normal operation mode may be made. In addition, the state of the detection means that may be affected by snow may be determined at a correct time, and the user may be notified of the information.

Additionally, it may be determined at a correct time whether the road is a snowy road other than the determination of step S402 in FIG. 4, and the snowy road mode may be ended if it is determined that the road is not a snowy road. In the determination at this time, if it is determined, based on the performance or state or the self-vehicle and the snow accumulation amount that it is impossible to support the snowy road mode, a notification may be made, and the control in FIG. 4 may be ended.

In this embodiment, road surface information is acquired by the detection means. As the road surface information here, a portion where snow is accumulated and a portion (wheel track) where the road surface is exposed may be identified, and the amount of snow in the snow accumulation portion may be estimated. In addition, the road surface information of the lane on which the self-vehicle is traveling and the road surface information of the adjacent lane may be combined. For example, if it is determined that the snow accumulation amount between the lanes or on the adjacent lane is small, alternate control may not be performed.

Additionally, the contents of alternate control may be switched in accordance with the state of the road surface. For example, when performing offset traveling at the time of cut-in by another vehicle, the moving amount may be decided within the range of wheel tracks formed on the lane on which the self-vehicle is traveling. If the offset traveling is performed beyond the range of formed wheel tracks, only deceleration control may be performed. This can prevent snow swirling by the self-vehicle and maintain the stability of traveling.

Note that in the above embodiment, an example in which another vehicle cuts in to the lane on which the self-vehicle is traveling has been described. However, the present invention is not limited to this. For example, similar control may be executed even in a case in which a two-wheeled vehicle traveling on the same lane passes.

In addition, the contents of distance shortening control may be changed in accordance with the size of another vehicle. For example, in a case of a large vehicle such as a truck, the range and amount of snow swirling are assumed to increase as compared to a small vehicle even if the snow accumulation amount is the same. For this reason, the degree of alternate control may be raised.

In addition, the degree of alternate control may be controlled based on the positional relationship or speed difference between another vehicle and the self-vehicle at the time of cut-in.

Summary of Embodiment

1. According to the above embodiment, there is provided a traveling control system (for example, 1) characterized by comprising:

detection means (for example, 31A, 31B, 32A, 32B) for detecting another vehicle traveling in the periphery and peripheral environmental information;

acquisition means (for example, 1A, 1B) for acquiring, based on information detected by the detection means, a range of a lane on which a self-vehicle travels;

first determination means (for example, 1A, 1B) for determining, based on the information detected by the detection means, approach of the other vehicle traveling in the periphery to the lane acquired by the acquisition means, on which the self-vehicle travels; and control means (for example, 1A, 1B) for performing traveling control to increase a distance between the self-vehicle and the other vehicle if it is determined by the first determination means that the approach by the other vehicle is made, wherein as the traveling control, the control means moves a traveling position of the self-vehicle in a lateral direction different from a side of the other vehicle.

According to this embodiment, it is possible to maintain and improve safety, functionality, and continuity in automated driving in a case in which cut-in by another vehicle occurs during automatic traveling.

2. The traveling control system according to the above embodiment is characterized in that as the traveling control, the control means controls to reduce a traveling speed of the self-vehicle.

According to this embodiment, it is possible to improve safety in automated driving by increasing, in the longitudinal direction, the distance from the other vehicle that has cut in.

3. The traveling control system according to the above embodiment is characterized by further comprising second determination means (for example, 1A, 1B) for determining, based on the information detected by the detection means, whether a state of a road surface is a snow accumulation state, wherein if it is determined by the second determination means that the state of the road surface is the snow accumulation state, processes by the first determination means and the control means are performed.

According to this embodiment, it is possible to maintain and improve safety, functionality, and continuity in automated driving in a case in which cut-in by another vehicle occurs during automatic traveling even during traveling on a snowy road.

4. The traveling control system according to the above embodiment is characterized by further comprising sensing means (for example, 1A, 1B) for sensing, based on the information detected by the detection means, a range of snow swirling caused by the approach of the other vehicle, wherein the control means decides a control amount in the traveling control in accordance with the range of the snow swirling sensed by the sensing means.

According to this embodiment, it is possible to determine the state of snow swirling and perform an avoidance operation for the swirling within a more appropriate range.

5. The traveling control system according to the above embodiment is characterized in that the larger the range of the snow swirling sensed by the sensing means is, the larger the control means makes the control amount in the traveling control.

According to this embodiment, it is possible to determine the state of snow swirling and perform an avoidance operation for the swirling within a more appropriate range.

6. The traveling control system according to the above embodiment is characterized in that the acquisition means further acquires a snow accumulation amount on the road surface based on the information detected by the detection means, and the control means decides the control amount in the traveling control in accordance with the snow accumulation amount.

According to this embodiment, it is possible to perform a more appropriate avoidance operation for snow swirling in accordance with the snow accumulation state on the road surface.

7. The traveling control system according to the above embodiment is characterized in that the control means decides the control amount in the traveling control in accordance with a size of the other vehicle determined to make the approach, a positional relationship between the other vehicle and the self-vehicle, and a speed difference between the vehicles.

According to this embodiment, it is possible to perform a more appropriate avoidance operation for snow swirling in accordance with the information of the other vehicle that has cut in.

8. The traveling control system according to the above embodiment is characterized in that the acquisition means further acquires, based on the information detected by the detection means, a range of a wheel track formed in the lane on which the self-vehicle travels, and the control means decides the control amount so as to perform the traveling control within the range of the wheel track acquired by the acquisition means.

According to this embodiment, it is possible to improve safety of traveling by preventing snow swirling by the self-vehicle or avoiding traveling in a snow accumulation portion.

9. A control method of a vehicle according to the above embodiment is a control method of a vehicle including detection means for detecting another vehicle traveling in the periphery and peripheral environmental information, characterized by comprising:

an acquisition step of acquiring, based on information detected by the detection means, a range of a lane on which a self-vehicle travels;

a determination step of determining, based on the information detected by the detection means, approach of the other vehicle traveling in the periphery to the lane acquired in the acquisition step, on which the self-vehicle travels; and a control step of performing traveling control to increase a distance between the self-vehicle and the other vehicle if it is determined in the determination step that the approach by the other vehicle is made, wherein in the control step, as the traveling control, a traveling position of the self-vehicle is moved in a lateral direction different from a side of the other vehicle.

It is possible to maintain and improve safety, functionality, and continuity in automated driving in a case in which cut-in by another vehicle occurs during automatic traveling.

The present invention is not limited to the above embodiments, and various changes and modifications can be made within the spirit and scope of the present invention. Therefore, to apprise the public of the scope of the present invention, the following claims are made.

The invention claimed is:

1. A traveling control system comprising:
   a sensor configured to detect another vehicle traveling in the periphery and peripheral environmental information; and
   a controller including at least one processor and at least one storage device, and configured to:
      acquire, based on information detected by the sensor, a range of a lane on which a self-vehicle travels;
      determine, based on the information detected by the sensor, approach of the other vehicle traveling in the periphery to the lane on which the self-vehicle travels;
      determine, based on the information detected by the sensor, whether a state of a road surface is a snow accumulation state;
      acquire, based on the information detected by the sensor, a range of snow swirling caused by the approach of the other vehicle if it is determined that the other vehicle traveling in the periphery approaches the lane on which the self-vehicle travels and the state of the road surface is the snow accumulate state; and
      move a traveling position of the self-vehicle in a lateral direction different from a side of the other vehicle so as to increase a distance between the self-vehicle and the other vehicle with a control amount in accordance with the range of the snow swirling if it is determined that the other vehicle traveling in the periphery approaches the lane on which the self-vehicle travels and the state of the road surface is the snow accumulate state.

2. The traveling control system according to claim 1, wherein the larger the range of the snow swirling, the larger the controller makes the control amount.

3. The traveling control system according to claim 1, wherein the controller is configured to acquire, based on the information detected by the sensor, a range of a wheel track formed in the lane on which the self-vehicle travels, and the controller is configured to decide the control amount so as to perform the traveling control within the range of the wheel track.

4. A control method of a vehicle including a sensor configured to detect another vehicle traveling in the periphery and peripheral environmental information, comprising:

an acquisition step of acquiring, based on information detected by the sensor, a range of a lane on which a self-vehicle travels;

a determination step of determining, based on the information detected by the sensor, approach of the other vehicle traveling in the periphery to the lane acquired in the acquisition step, on which the self-vehicle travels;

a determination step of determining, based on the information detected by the sensor, whether a state of a road surface is a snow accumulation state;

an acquisition step of acquiring, based on the information detected by the sensor, a range of snow swirling caused by the approach of the other vehicle if it is determined that the other vehicle traveling in the periphery approaches the lane on which the self-vehicle travels and the state of the road surface is the snow accumulate state; and a control step of performing traveling control to move a traveling position of the self-vehicle in a lateral direction different from a side of the other vehicle so as to increase a distance between the self-vehicle and the other vehicle with a control amount in accordance with the range of the snow swirling if it is determined that the other vehicle traveling in the periphery approaches the lane on which the self-vehicle travels and the state of the road surface is the snow accumulate state.

* * * * *